UNITED STATES PATENT OFFICE.

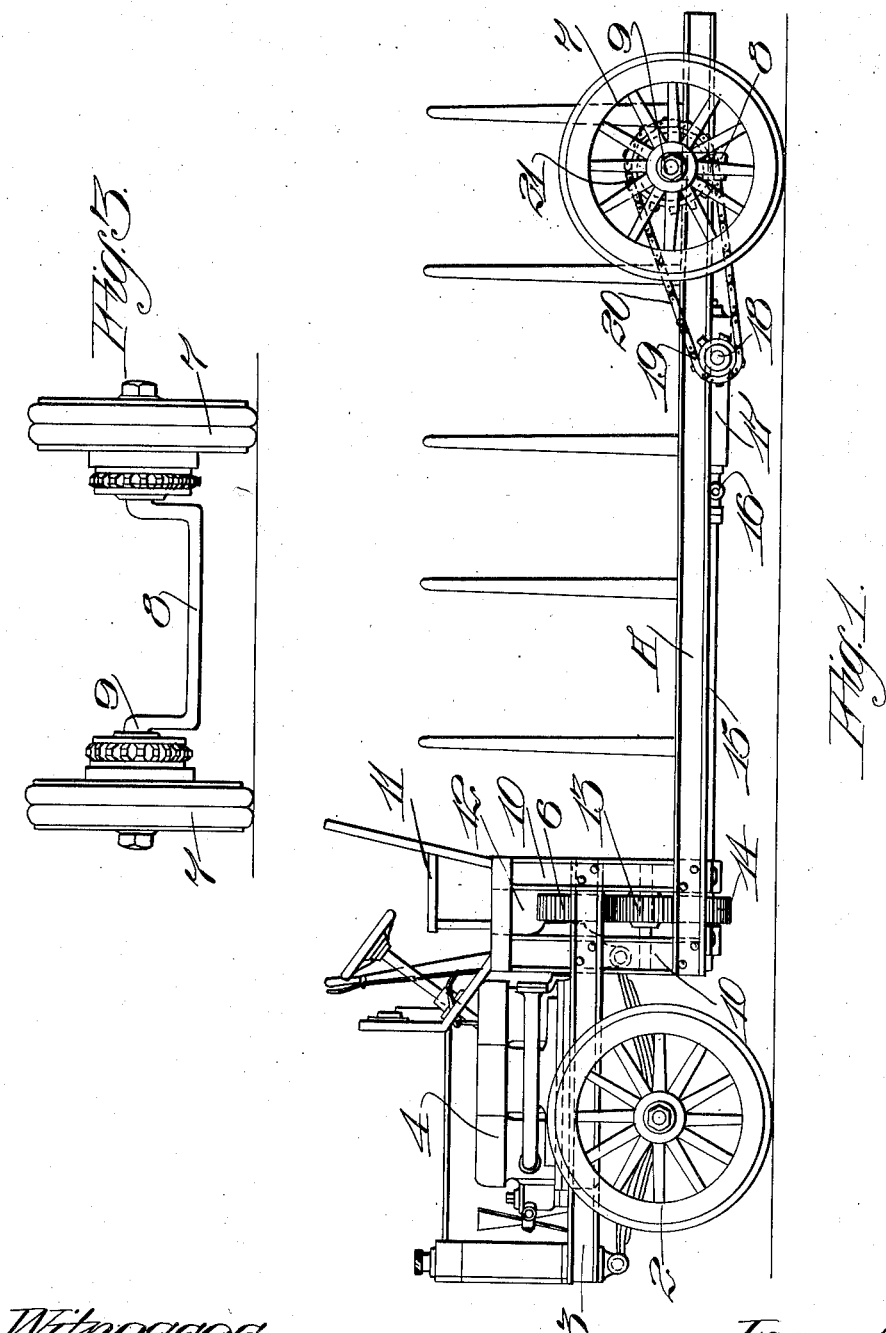

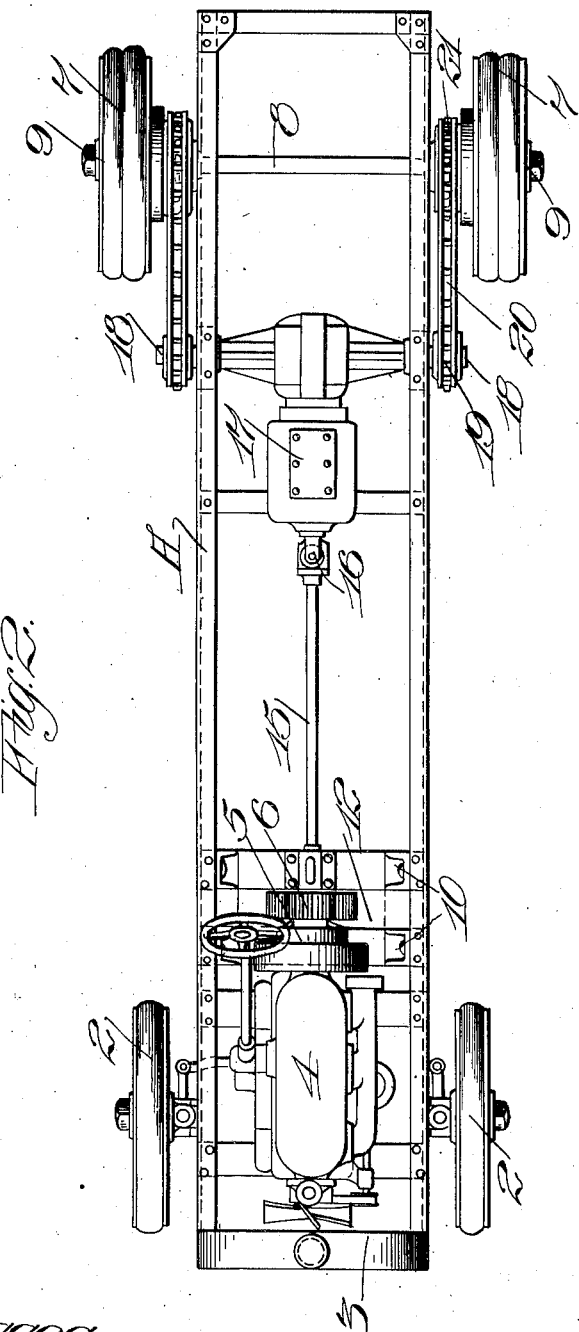

SOLOMON J. LEVY, OF SAN FRANCISCO, CALIFORNIA.

LOW-HUNG MOTOR-TRUCK.

1,038,162.      Specification of Letters Patent.      Patented Sept. 10, 1912.

Application filed April 6, 1911. Serial No. 619,275.

*To all whom it may concern:*

Be it known that I, SOLOMON J. LEVY, citizen of the United States, residing in the city and county of San Francisco and State of California, have invented new and useful Improvements in Low-Hung Motor-Trucks, of which the following is a specification.

This invention relates to self-propelled vehicles, and particularly to heavy duty trucks.

It is the object of this invention to provide a powerful truck for the conveyance of heavy articles of freight or general merchandise, and it is a particular object of the invention to provide a truck embodying special details of construction and design, having in view, principally, the provision of a vehicle whereby labor and time are saved when loading heavy articles.

The invention consists of the parts and the combination and construction of parts as hereinafter more fully explained, having reference to the accompanying drawings, in which—

Figure 1 is a side elevation of the truck. Fig. 2 is a plan view, and Fig. 3 is an end view showing the drop-axle.

Auto trucks, as now most universally constructed, have their beds on a plane considerably elevated from the ground by reason of the use of straight axles at their rear ends, and when so constructed it becomes necessary to use derricks and other extraneous devices for lifting the material to be carried into position, and it is particularly with a view of aiding in the loading of trucks that I have devised the truck represented in the accompanying drawings, in which 2 are the forward steering wheels of the vehicle, mounted upon an appropriate shaft, and between which extends the forward portion 3 of the vehicle frame. This portion 3 of the frame is shown as being mounted considerably above the plane of the center of the steering wheels 2, and supporting a driving motor 4, of any appropriate design, upon the shaft of which is secured a suitable clutch 5, carrying a driving gear 6. By so arranging the forward part 3 of the frame, the load of the engine is transmitted directly to the steering wheels, and I am enabled to very considerably lower the main freight-bearing portion of the frame, as at A, upon which the bed of the truck may be laid. I have shown the bed portion A of the frame as extending from immediately behind the steering wheels 2 rearwardly between driving wheels 7.

A particular and distinctive feature in the design of my present truck is to mount the wheels 7 upon an axle, as 8, the main portion of which is dropped considerably below the wheel-bearing spindles 9, and mounting the rear end of the bed-frame A upon the dropped portion of the axle 8, so that the carrying surface of the frame is substantially in a plane proximate the center of the driving wheels 7. This construction allows ample clearance below the axle 8, as well as rendering much less difficult the loading of the vehicle.

Manifestly, I may employ any suitable means for connecting the upper projecting portion 3 of the frame to the main portion A, and if desired, these two portions may be integrally formed, but I have, in the present instance, shown the frame portions 3 and A as connected by suitable vertical members 10, above which may be mounted the driver's seat 11.

By projecting the adjacent ends of the frame portions 3 and A past one another, and bracing them, there is formed a gear chamber 12, in which is mounted the driving pinion 6, from which power may be transmitted by any desired form of transmission, represented here as by an intermediate gear 13, meshing with another gear 14, secured upon the end of a drive shaft 15, connected, as by a flexible joint 16, to a transmission gear, represented at 17.

From the transmission 17, projects a transverse jack-shaft 18, carrying sprockets 19, driving chains 20, which run over suitable sprockets 21, secured to the driving wheels.

I do not wish to be limited to any particular form of transmission mechanism from the power member 4 to the driving wheels 7, as it is obvious that various means may be employed to transmit power from the engine shaft which is in a plane considerably above the center of the driving wheels, and the feature to which I particularly direct attention is the low-hung freight-carrying bed frame A.

It will be manifest that in place of the train of gearing, sprockets and intermediate chains may be employed to transmit power from the engine shaft to the drive shaft.

Having thus described my invention, what

I claim and desire to secure by Letters-Patent, is—

An auto truck having in combination, steering wheels, driving wheels, a frame extending between the wheels having a portion projecting forwardly in a plane above the center of the steering wheels and having another portion, the upper surface of which is in a plane approximate the center of the driving wheels, a motor upon the elevated portion of said frame, a drive shaft beneath the other or main portion of the frame, the two parts of the frame having adjacent ends projected one past the other, parallel spaced members connecting these portions and forming a chamber, and a transmission mechanism contained within said chamber.

In testimony whereof I have hereunto set my hand in the presence of two subscribing witnesses.

SOLOMON J. LEVY.

Witnesses:
 JOHN H. HERRING,
 L. C. BLASDEL.